United States Patent [19]
Richards

[11] Patent Number: 4,821,583
[45] Date of Patent: Apr. 18, 1989

[54] TENSION MEASURING APPARATUS
[75] Inventor: Brian D. Richards, Columbus, Ohio
[73] Assignee: E. I. Du Pont de Nemours and Company, Wilmington, Del.
[21] Appl. No.: 73,098
[22] Filed: Jul. 14, 1987
[51] Int. Cl.⁴ .............................................. G01L 5/10
[52] U.S. Cl. .................................................. 73/862.48
[58] Field of Search .......... 73/862.48, 862.65, 862.66, 73/862.67

[56] References Cited
U.S. PATENT DOCUMENTS

| Re. 31,312 | 7/1983 | Eddens . | |
|---|---|---|---|
| 2,911,823 | 11/1959 | Nistico . | |
| 3,280,623 | 10/1966 | Saxl .............................. | 73/862.48 X |
| 3,512,406 | 5/1970 | Roberts . | |
| 3,554,025 | 1/1971 | Andersson et al. . | |
| 3,602,866 | 8/1971 | Saxl . | |
| 4,245,794 | 1/1981 | Hasegawa et al. . | |
| 4,295,360 | 10/1981 | Fountain . | |
| 4,326,424 | 4/1982 | Koenig . | |
| 4,674,339 | 6/1987 | Hatamura et al. ............... | 73/862.04 |
| 4,674,341 | 6/1987 | Koenig .............................. | 73/862.48 |
| 4,674,342 | 6/1987 | Ushijima et al. . | |
| 4,688,434 | 8/1987 | Cherbuy ........................... | 73/862.65 |

FOREIGN PATENT DOCUMENTS 353555 5/1961 Switzerland ..................... 73/862.65

OTHER PUBLICATIONS
Huntleigh Load Cells.

Primary Examiner—Jerry W. Myracle

[57] ABSTRACT

A threadline tension measuring apparatus having a dual beam cantilever supporting an even threadline guide surface wherein tension measured is insensitive to axial location of threadline loading. Overload and structural protection for the apparatus are provided.

3 Claims, 5 Drawing Sheets

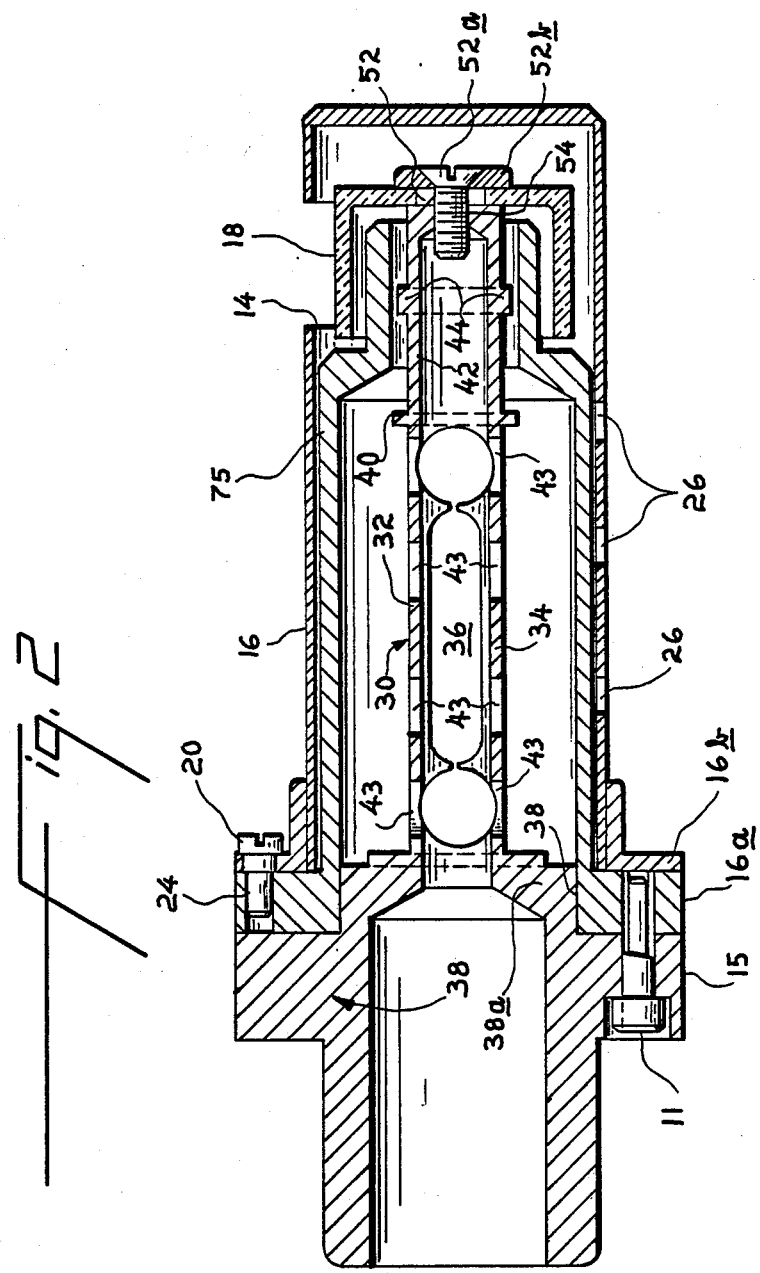

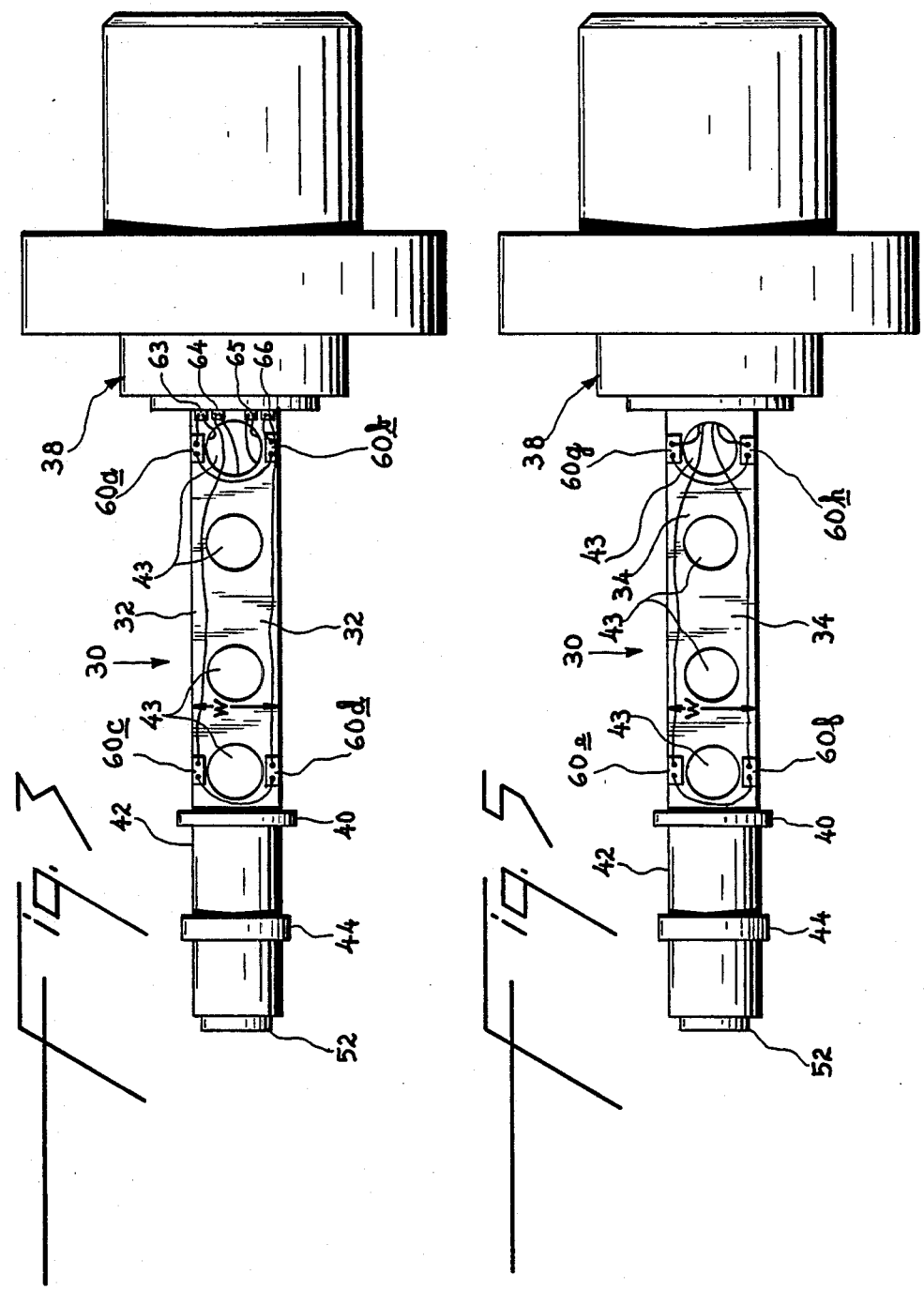

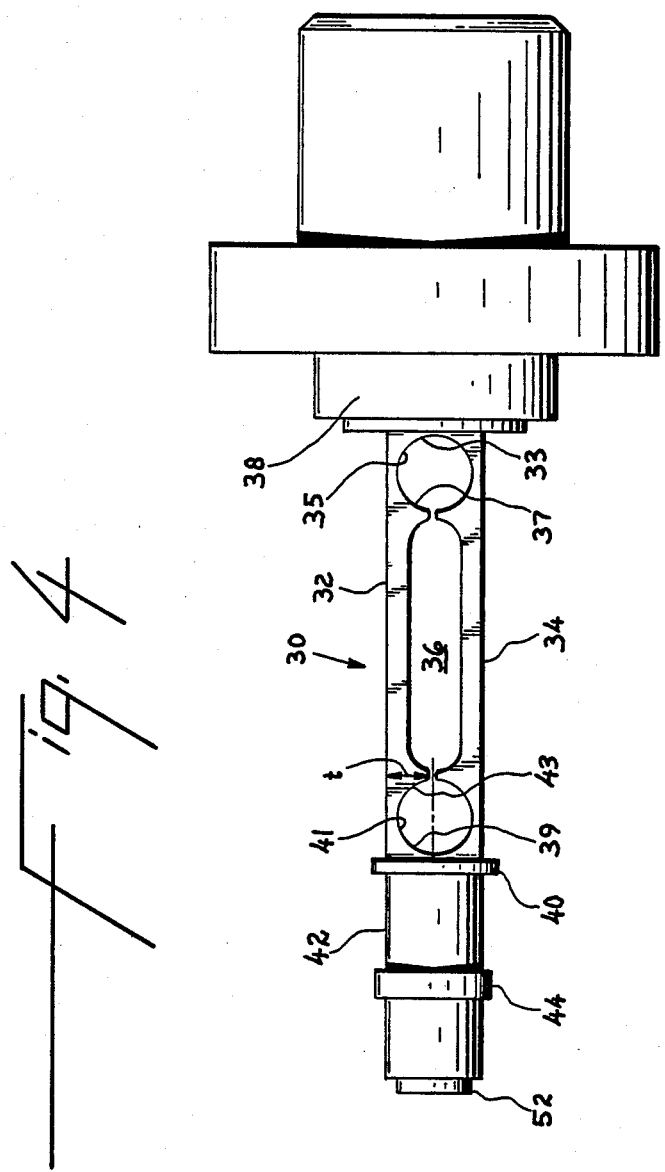

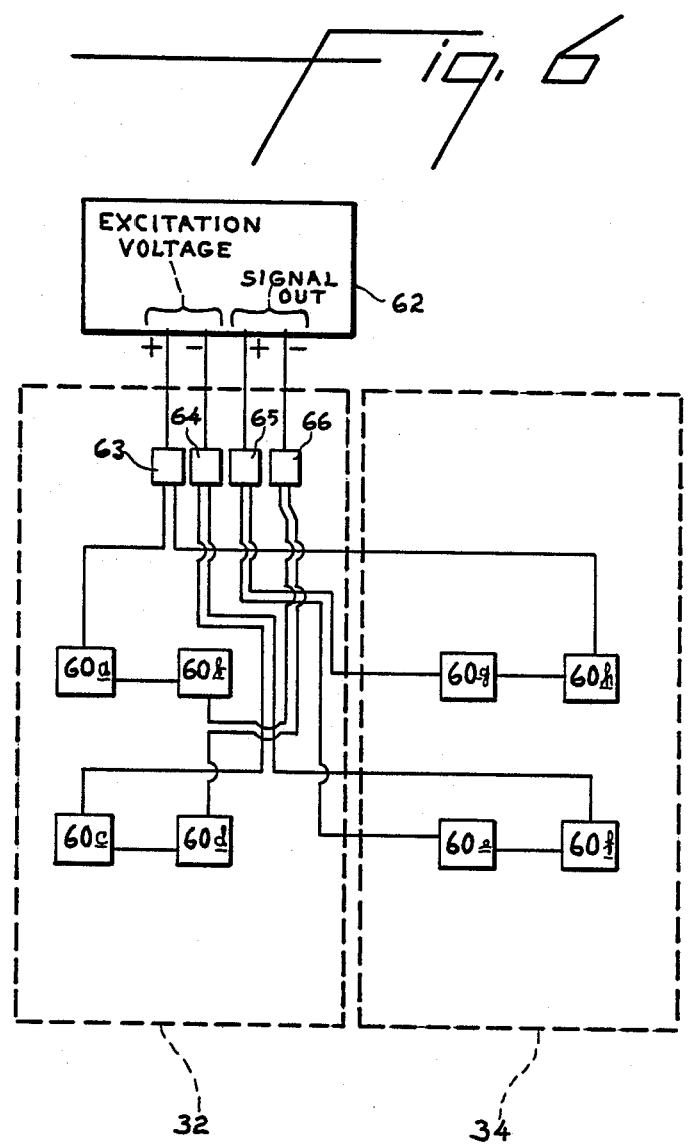

TENSION MEASURING APPARATUS

BACKGROUND

This invention relates to measurement of tension in a moving threadline, and more particularly, to a tensiometer having an even surface threadline guide.

The measurement and monitoring of the tension of a moving threadline is essential in many filament and yarn processing operations. U.S. Pat. No. 4,295,360 to Fountain discloses one device for measuring threadline tension that includes a threadline direction-changing guide mounted at one end of a strain sensing cantilever. The threadline guide is typical of other prior art tensiometer guides in that it includes a groove for containing and preventing the threadline from wandering longitudinally along the guide surface. Likewise, U.S. Pat. No. Re. 31,312 to Eddens discloses a tension monitoring device having a rotatable pulley with an annular groove for accepting strand material. However, the use of a grooved guide surface for containing a moving threadline has been found to be undesirable for several reasons. For example, confining a running threadline within a grooved guide relies on a certain baseline level of threadline tension in order to keep the threadline firmly positioned within the groove. However, tension of the threadline at the desired measurement location can be too low to utilize a grooved guide for accurate tension measurement while still maintaining normal process conditions.

It would be desirable to have an even surfaced guide over which the threadline could run because a threadline running in a groove may create increased friction versus a threadline running over a flat surface and, decrease the sensitivity level of the tensiometer.

One problem with replacing a grooved guide with a guide having an even surface is that a running threadline wanders longitudinally along an even surface of a guide resulting in different and erroneous readings by the tensiometer for any particular tension. Devices such as Fountain's referenced above, if fitted with an even guide surface, would measure, in addition to actual threadline tension, a tension which would vary with respect to the axial location of the threadline as it wandered along the guide surface.

Furthermore, it is highly desirable to provide a wide range of accurate tension capability without sacrificing sensitivity at low ranges of tension while maintaining structural stability against erroneous forces.

SUMMARY OF THE INVENTION

This invention provides a threadline tension measuring apparatus which has a non-grooved even threadline guide surface, wherein measured tension is insensitive to the axial location of the threadline.

The apparatus has a pair of deflectable beams spaced from and parallel to each other, said beams are attached at one end to an even surfaced thread guide and fixed at the opposite end to a base. The beams have successive lengths of varying thickness from each end. The lengths of varying thickness decrease to a minimum thickness then increase to a maximum thickness from each end and there are two strain transducers mounted at each end of each beam at the locations of minimum thickness.

In this manner, the invention provides a dual beam tension measuring device of a one-piece integral design having maximum sensitivity to flexure in a plane normal to said beams while maintaining structural stability against forces perpendicular or rotational to said beams.

The tension measuring device further includes a cover for protection from hostile threadline processing environments and overload protection.

BRIEF DESCRIPTION OF THE DRAWINGS

FIG. 2 is a cross-sectional view of FIG. 1 taken along line A—A.

FIGS. 3-5 are top, side and bottom views of the tension sensing beam block embodied within this invention.

FIG. 6 is an electrical wiring diagram showing how the strain sensing gages are connected.

DETAILED DESCRIPTION OF THE PREFERRED EMBODIMENT

Figure 1:
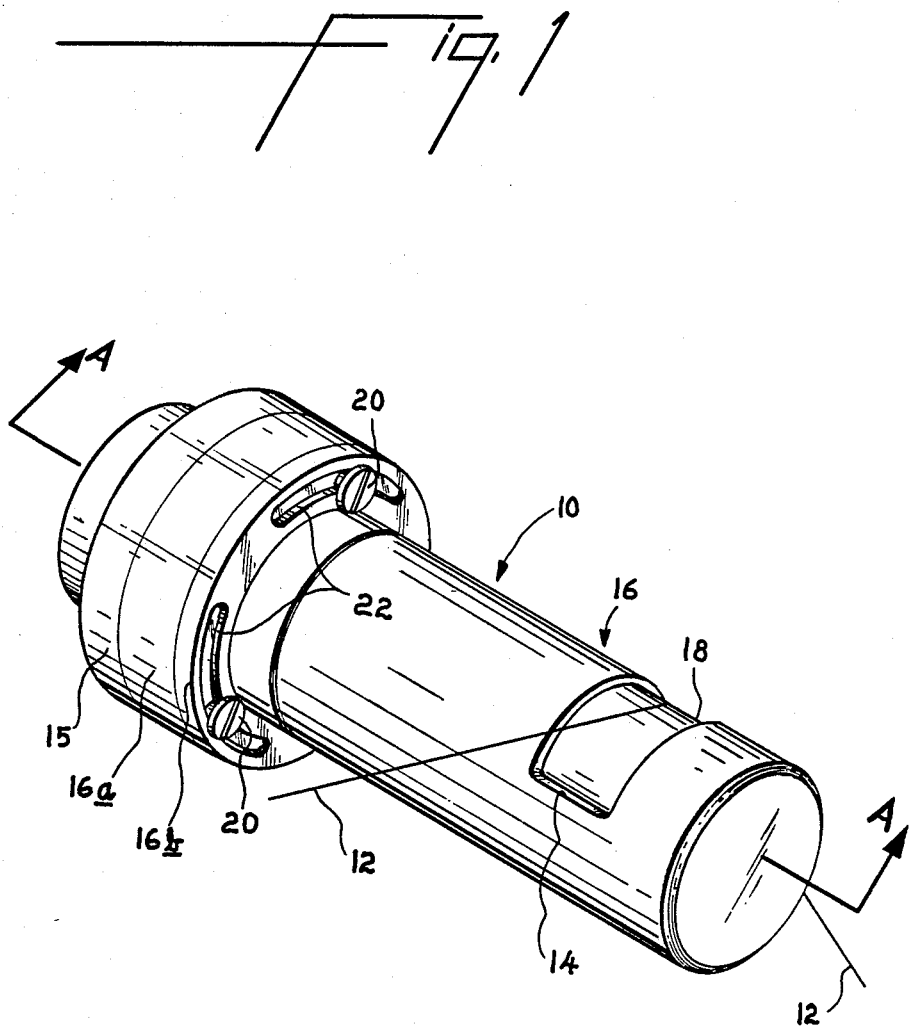
FIG. 1 is a perspective view of a tensionmeter in accordance with the invention.

Referring to the drawings, FIGS. 1 and 2 show an assembled tensiometer 10 of this invention wherein a threadline 12 passes through an opening 14 in protective cover 16 to engage an even surface threadline guide 18. Protective cover 16 is a hollow cylindrical body which is adjustably mounted to overload support flange 16a by passing threaded bolts 20 through arcuate slots 22 of cover flange 16b and into threaded holes 24 of flange 16a. Cover 16 can be adjusted by rotating it about its longitudinal axis until the desired orientation of opening 14 is achieved. Cover 16 has drain holes 26 located on the underside thereof for the release of any threadline processing fluids which might accumulate within the tensiometer during actual operation. Cover 16 acts to protect the threadline guide 18 from damage caused by accidental contact of the tensiometer with process tools or misaligned threadlines during threadline processing operations.

Referring now to FIGS. 2-5, tension measuring beam block 30 is now described. Two rectangular deflectable beams 32 and 34 are positioned parallel to and separated from each other to define a space 36. Beams 32 and 34 are fixed at one end to end member 38 and at the opposite end to front member 40.

Front member 40 has fixed thereto a threadline guide mounting means comprising a cylindrical shaft 42 extending out from front member 40, a collar 44 attached to shaft 42 and attachment member 52, extending from shaft 42 and having a threaded opening 54 defined therein.

Each beam 32,34 has a width (W) greater than its thickness (t) and the width of the beams is oriented to detect forces perpendicular thereto. An important feature of each beam is the manner in which its thickness varies along its length. More particularly, each beam has successive lengths of varying thickness from each end. These lengths will be described in detail for beam 32 only since beams 32 and 34 are structured the same. With regard to beam 32, from the end fixed to end member 38, there are successive lengths 33,37, decreasing from a maximum to a minimum thickness at location 35 then increasing to the maximum thickness, respectively. From the end of beam 32 attached to front member 40 the beam has successive lengths 39,43 decreasing from a maximum to a minimum thickness at location 41 then back to the maximum thickness, respectively.

Beam block 30 is preferably of one-piece construction and machined from 2024-351 aluminum alloy.

Fixed to the outer (i.e. upper) surface of the beam 32 are four strain gage members 60a, 60b, 60c, and 60d located at both ends of and off center of the longitudinal axes at the location of minimum thickness of said beam. Lower beam 34 has four strain gages, 60e, 60f, 60g, 60h attached to its outer (i.e., lower) surface in identical fashion to upper beam 32.

Beams 32, 34 have locations of minimum thickness as described above that represent maximum flexure points for the beams and strain gage members 60a–h are advantageously located on beams at these locations. This allows for maximum sensitivity to flexure in a plane normal to beams 32,34 while the rectangular beam configuration maintains structural stability against forces perpendicular to said beams. Fixing of the beams 32,34 both to members 38 and 40 aids in maintaining structural stability against forces rotational to the beam axis.

Beams 32,34 are further defined by having a plurality of openings 43 centered on the plane of the beam. Openings 43 allow for a reduction in mass of the beam members while maintaining stability against off-axis loading of the beams as well as allowing for improved stress versus load on the attached strain gages 60. Beam length is advantageously several times longer than beam width.

Hollow cylindrical overload protection member 75 is positioned over beam block 30, centered by the hub 38a of member 38 with its flange 15 secured to the mounting flange 16a of overload member 75 by bolt 11. Threadline guide 18 is secured to beam block member 52 by passing threaded bolt 52a through washer 52b and into threaded opening 54.

Referring now to FIG. 6, it can be seen that strain gages 60a–60h are interconnected to form a bridge circuit which in turn is connected to a strain gage input amplifier 62. The amplifier 62 (Model 3B16-00 by Analog Devices Co. Boston, Mass.) supplies excitation voltage to the bridge and receives voltage signals from the bridge and amplifies them for a measured output proportional to tension. More particularly, a DC voltage for excitation of the bridge circuit is supplied by amplifier 62 to terminal tabs 63,64 on the end of beam 32 and voltage signals from the bridge are fed to amplifier 62 via terminals 65,66 also on beam 32.

In operation, threadline 12 runs over guide 18 which causes attached beams 32,34 to flex in proportion to threadline tension thereby putting strain gages 60a, 60b, 60e, 60f in tension and gages 60g, 60h, 60c, 60d in compression. The tension and compression of the gages result in a voltage signal output from the bridge circuit proportional to the flexure of the beams and therefore threadline tension. Measured tension will be independent of the axial location of the threadline on the surface of guide 18.

If threadline tension increased over a predetermined amount, guide 18 will move collar 44 of beam block 30 into contact with the inner surface of overload protection member 75 thereby also limiting motion during overload conditions.

Tensiometers built as described above will accurately measure threadline tensions in the 10–10000 gram range.

I claim:

1. In a yarn direction-changing tension measuring apparatus that includes a direction-changing guide and means for mounting said guide to a fixed base, said means including a pair of spaced parallel longitudinal beams connected at one end to said guide and at their other to said base, each of said beams having a width greater than their thickness with the width of said beams being oriented to detect forces perpendicular thereto and one or more strain transducers mounted to the beams, the improvement comprising: said direction changing guide having an even surface over which said yarn travels, and said beams having successive lengths of varying thickness decreasing to a minimum then increasing to a maximum thickness from each end, there being two strain transducers mounted at each end of each beam at a location of said minimum thickness connected in a bridge circuit to provide an output signal proportional to the flexure of the beams and independent of the location of the yarn on said even surface.

2. In a yarn direction-changing tension measuring apparatus that includes a direction-changing guide and means for mounting said guide to a fixed base, said means including a pair of spaced parallel longitudinal beams connected at one end to said guide and at their other to said base, each of said beams having a width greater than their thickness with the width of said beams being oriented to detect forces perpendicular thereto and one or more strain transducers mounted to the beams, the improvement comprising: said direction changing guide having an even surface over which said yarn travels, and said beams having successive lengths of varying thickness decreasing to a minimum then increasing to a maximum thickness from each end, there being two strain transducers mounted at each end of each beam at a location of said minimum thickness connected in a bridge circuit to provide an output signal proportional to the flexure of the beams and independent of the location of the yarn on said even surface, each of said beams having a plurality of openings centered on the plane of the width of the beam.

3. In a yarn direction-changing tension measuring apparatus that includes a direction-changing guide and means for mounting said guide to a fixed base, said means including a pair of spaced parallel longitudinal beams connected at one end to said guide and at their other to said base, each of said beams having a width greater than their thickness with the width of said beams being oriented to detect forces perpendicular thereto and one or more strain transducers mounted to the beams, the improvement comprising: said direction changing guide having an even surface over which said yarn travels, and said beams having successive lengths of varying thickness decreasing to a minimum then increasing to a maximum thickness from each end, there being two strain transducers mounted at each end of each beam at a location of said minimum thickness connected in a bridge circuit to provide an output signal proportional to the flexure of the beams and independent of the location of the yarn on said even surface; and a cover attached to said base enclosing said beams and said guide, said cover having an opening adjacent said guide surface to permit ingress and egress of said yarn to said surface.

* * * * *